United States Patent [19]

Takada et al.

[11] Patent Number: 4,533,990

[45] Date of Patent: Aug. 6, 1985

[54] COMPUTER PROCESS CONTROL SYSTEM

[75] Inventors: Keisuke Takada; Hiroo Okuhara, both of Tokyo, Japan

[73] Assignee: Tokyo Shibaura Denki Kabushiki Kaisha, Kawasaki, Japan

[21] Appl. No.: 415,799

[22] Filed: Sep. 8, 1982

[30] Foreign Application Priority Data

Oct. 18, 1981 [JP] Japan .................. 56-166262

[51] Int. Cl.³ .............................. G06F 15/46
[52] U.S. Cl. .................... 364/160; 364/131; 364/146; 364/181; 318/591
[58] Field of Search ............... 364/130–131, 364/137, 140, 146, 148, 150–151, 160, 171, 176, 180, 181, 200 MS File, 900 MS File; 318/564, 569, 590–591, 600, 671; 307/38–39

[56] References Cited

U.S. PATENT DOCUMENTS

| | | | |
|---|---|---|---|
| 3,896,871 | 7/1975 | Pecoraro et al. | 364/181 X |
| 3,987,351 | 10/1976 | Appelberg et al. | 364/181 X |
| 4,189,765 | 2/1980 | Kotalik et al. | 364/120 |
| 4,344,127 | 8/1982 | McDaniel et al. | 364/130 |
| 4,344,128 | 8/1982 | Frye | 364/181 X |
| 4,371,922 | 2/1983 | Fujita et al. | 364/146 X |
| 4,404,625 | 9/1983 | Saito et al. | 364/146 X |
| 4,418,381 | 11/1983 | Molusis et al. | 364/131 |
| 4,424,559 | 1/1984 | Lorincz et al. | 364/131 |
| 4,428,054 | 1/1984 | Aizawa et al. | 364/160 X |
| 4,430,698 | 2/1984 | Harris | 364/160 X |

OTHER PUBLICATIONS

Advances in Instrumentation, vol. 31, Part 1, ISA Conference No. 541, "Design Considerations for Achieving Reliable Control Within Shared Microprocessor-Based Digital Controllers".

Primary Examiner—Jerry Smith
Assistant Examiner—Gary V. Harkcom
Attorney, Agent, or Firm—Oblon, Fisher, Spivak, McClelland & Maier

[57] ABSTRACT

A computer process control system includes at least one control section which is housed in a case and connected to a detection terminal and which automatically produces an operation signal for compensating for a difference between a process variable and a preset target value. At least one man-machine interface unit is included separate from the control section to display the process variable and the target value and to allow the operator to manually produce an operation signal. An output section is detachably connected to the control section and the man-machine interface unit and supplies one of the operation signals, in accordance with one of the corresponding operation modes, to a process actuator terminal. The man-machine interface unit is coupled to a selected loop to be supervised by the operator.

14 Claims, 6 Drawing Figures

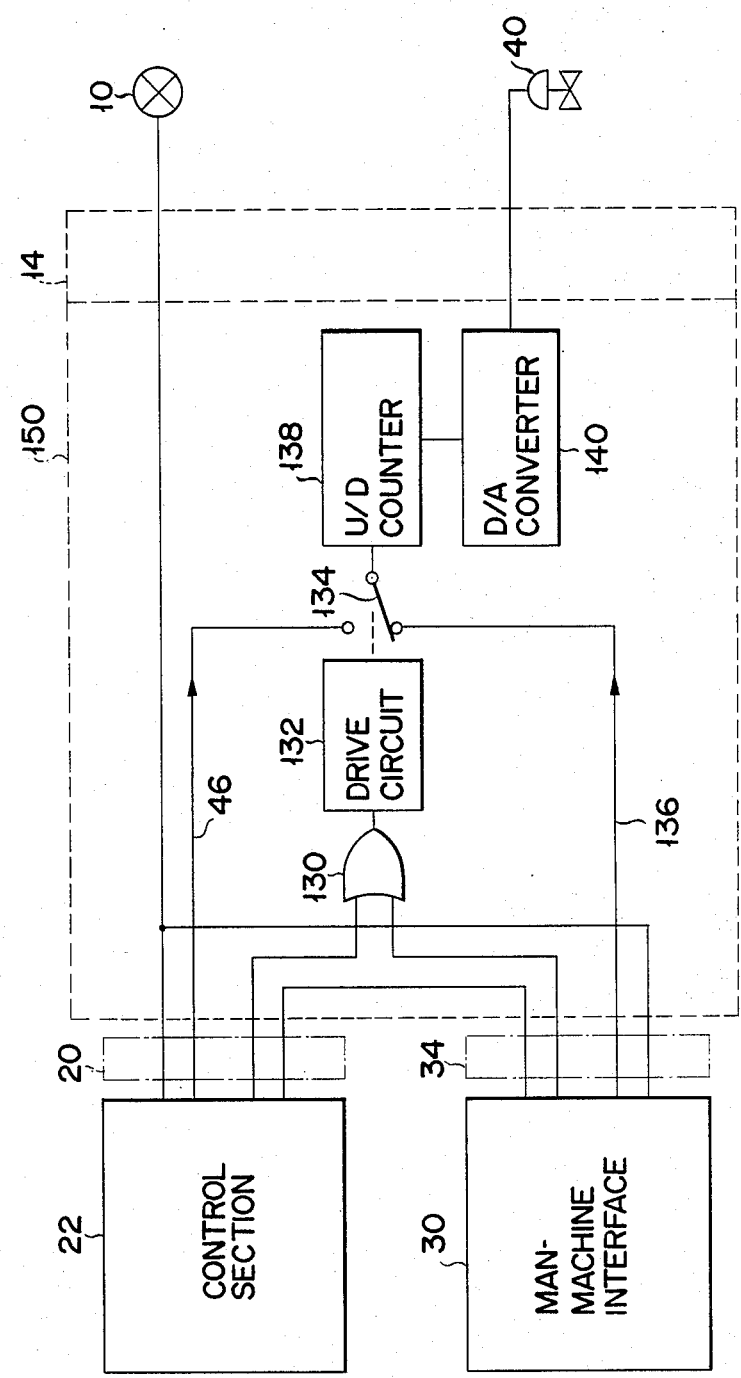
F I G. 6

COMPUTER PROCESS CONTROL SYSTEM

BACKGROUND OF THE INVENTION

The present invention relates to process control systems and, more particularly, to a microcomputer system for controlling a process by performing arithmetic operations with a microcomputer.

In process control systems, a computer process control system with a microcomputer therein has been developed to control the process without the necessity of the conventional instrumentation. The process control system with a microcomputer can freely perform various control operations such as feedback control, cascade control, feed forward control, sampling control, sequence control and so on in accordance with corresponding software. The free combination of control operations provides a variety of process applications and highly precise control characteristics.

A single-loop controller includes a man-machine interface and a microcomputer (control device) to perform direct digital control (DDC) which responds to a trend toward diversification of the control system and which is directly coupled to the process to control it. The man-machine interface and the microcomputer are housed together in a single housing.

Analog detection signals are transmitted from a plurality of detection terminals or detectors which detect predetermined kinds of variables relating to physical or chemical processes and the like and are selected by a multiplexer. The selected analog detection signal is then converted to a digital signal. The digital signal is supplied to the central processing unit (CPU) of a microprocessor. In the CPU, the digital signal is processed in accordance with a preset operation program. The operation result is stored in an up/down counter. A preset value (target value) corresponding to the reference operating condition of the process detected at the detector is preset in the up/down counter by the CPU. If a disturbance (a source which interferes with automatic control) occurs in the process, the CPU compensates for the disturbance by generating a command signal so as to match a variable of the process and the target value. The command value indicated by the command signal is temporarily digitally held in the up/down counter and is then converted to an analog signal. The analog signal is further converted to an analog operation signal which is supplied to an operation terminal or actuator. As a result, the process is automatically controlled so that the variable thereof reaches the preset target value.

It is very useful for a DDC operation to use the conventional single-loop controller in which the man-machine interface and the control device are integrally assembled. However, if the single-loop controller is applied to a large-scale instrumentation system, especially, if a total display device such as a cathode-ray tube (CRT) is assembled in the system to perform centralized control of the process and to achieve a so-called panelless operation with a CRT display, its usefulness is degraded. In other words, if a plurality of single-loop controllers each one of which has a non-separable man-machine interface corresponding to analog instrumentation are arranged, similar man-machine interfaces are continuously aligned, and the total area of the panels is undesirably increased, resulting in waste of the space of the instrument room. Further, if the CRT display device is used, man-machine interfaces corresponding to the number of instrumentation loops need not be used. Therefore, the man-machine interfaces of the CRT overlap the CRTs, and/or the transmission systems also overlap each other. Further, it is inefficient for the operator to supervise all man-machine interfaces including the man-machine interfaces which overlap the CRTs.

Since the automatic control equipment for computer processing is used in a variety of applications, it is strongly desirable that the equipment, including the CRT display device, be freely designed and assembled at an instrumentation engineering level and that the control functions also be improved. The conventional single-loop controller fails to satisfy the needs for easy and various applications in large-scale instrumentation as well as small-scale instrumentation.

In order to solve the above problem and to satisfy the needs described above, a man-machine interface and a control device of a single-loop controller are separated and assembled in an instrumentation system in accordance with each level after separation. However, even if the man-machine interface and the control device are simply separated and assembled in separate housings or cases, respectively, and are connected by cables, the above arrangement does not provide an effective solution because wirings are complicated. If the control devices are housed in a cabinet, cables from the process and separated man-machine interfaces are concentrated at one part of the cabinet. The number of cables is increased if the number of loops is increased, resulting in disadvantages from the viewpoint of inspection and maintenance. Further, room for the additional cables to allow system expansion is so small that the system cannot be effectively expanded.

Further, according to the above arrangement, when a broken control device is disconnected from the system, little or no operation output is produced from the CPU, and the process control may be greatly damaged. During the period for which the broken control device is removed from the system, it is difficult to back up the system by manual control with the man-machine interface.

The effective solution cannot be presented simply by separating the man-machine interface from the control device of the single-loop controller.

SUMMARY OF THE INVENTION

It is, therefore, an object of the present invention to provide a new and improved system for performing process control with greater flexibility in a variety of applications.

It is a further object of the present invention to provide a new and improved system for performing digital process control which is capable of building up or arranging a control system with a cathode-ray tube display device in a variety of applications of process control.

It is another object of the present invention to provide a new and improved system for performing digital process control wherein a man-machine interface section and a control section are effectively controlled and connections therebetween are not complicated, and wherein the panel area is small but yet accommodates a cathode ray tube display device to improve the operability of the system for an operator.

According to the process control system of the present invention, the computer control device and the man-machine interface device are separated from each other. The computer control device is housed in a case member and is connected to at least one detecting section for detecting a process variable. In a first operation mode, the computer control device compares the process variable and a preset target value. If a difference is present between the process variable and the target value, data corresponding to the difference is processed by a predetermined arithmetic operation. The computer control device then produces a first electrical signal for minimizing the difference. The man-machine interface device is housed in another case member and is connected to the detecting section. The man-machine interface device displays the process variable and the target value and produces a second electrical signal for minimizing the difference in a second operation mode. The process control system further comprises an output device which is detachably connected to the computer control device and to the man-machine interface device to receive the first and second electrical signals, and which supplies an operation signal to a process actuator section. With the above arrangement, the process control system can be flexibly expanded, and the process control can be continued in response to the second electrical signal even if the computer control device is broken.

BRIEF DESCRIPTION OF THE DRAWINGS

FIG. 6 is a block diagram of an internal arrangement of the process control system shown in FIG. 5.

DETAILED DESCRIPTION OF THE PREFERRED EMBODIMENTS

Figure 1:
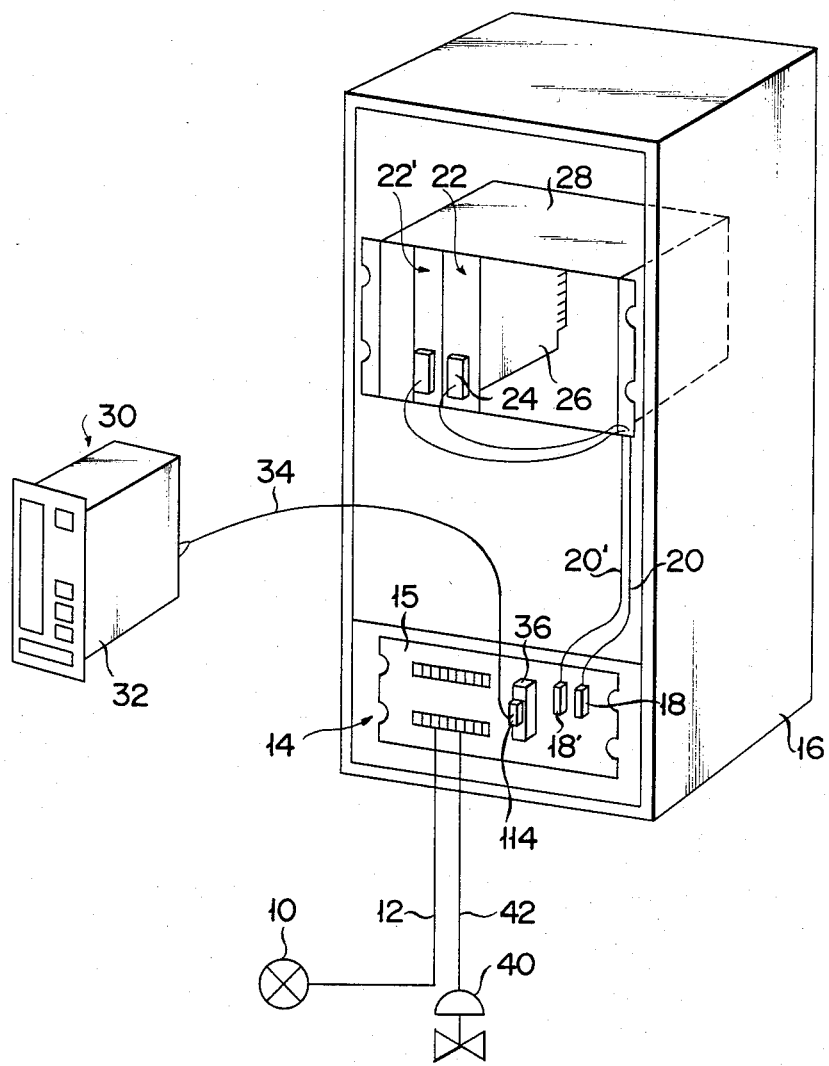
FIG. 1 is a perspective view of the overall arrangement of a separate type process control system according to one embodiment of the present invention.

Referring now to FIGS. 1 to 4, there is illustrated one embodiment of a process control system in accordance with the present invention. In FIG. 1, a predetermined kind of variable (such as temperature, flow rate, pressure) for a physical or chemical process or the like is quantitatively measured, and an analog detection signal Sd (FIG. 2) corresponding to one variable is generated at one detection terminal or detector 10. The detector 10 is connected through a lead 12 to a signal relay section 14. The signal relay section 14, with a connection panel 15 is housed in the lower part of a cabinet 16 in this embodiment. The signal relay section 14 is connected to a control section 22 through a detachable connector 18 and a cable 20. The cable 20 is connected to the control section 22 by a detachable connector 24. The control section 22 comprises a printed circuit board 26 on which IC elements are mounted. The printed circuit board 26 is housed in a separate case 28. The case 28 is fixed in the cabinet 16. If a plurality of loops are controlled, the number of sets each comprising the detector 10, the control section 22 and the actuator 40 corresponds to the number of loops. Referring to FIG. 1, if a control section 22' is added, the control section 22' is housed parallel to the control section 22 in the case 28. A connector 18' connected to the control section 22' through a cable 20' is connected to the signal relay section 14.

A man-machine interface 30 is housed in a case 32 which is separated from the control section 22. The man-machine interface 30 is arranged for a specific loop to be supervised by the operator and is detachably connected to the control section 22 through a cable 34, an operation output section or actuation output section 36 to be described later, and the signal relay section 14. A process actuator 40 is connected to the signal relay section 14 through a lead 42.

Figure 2:
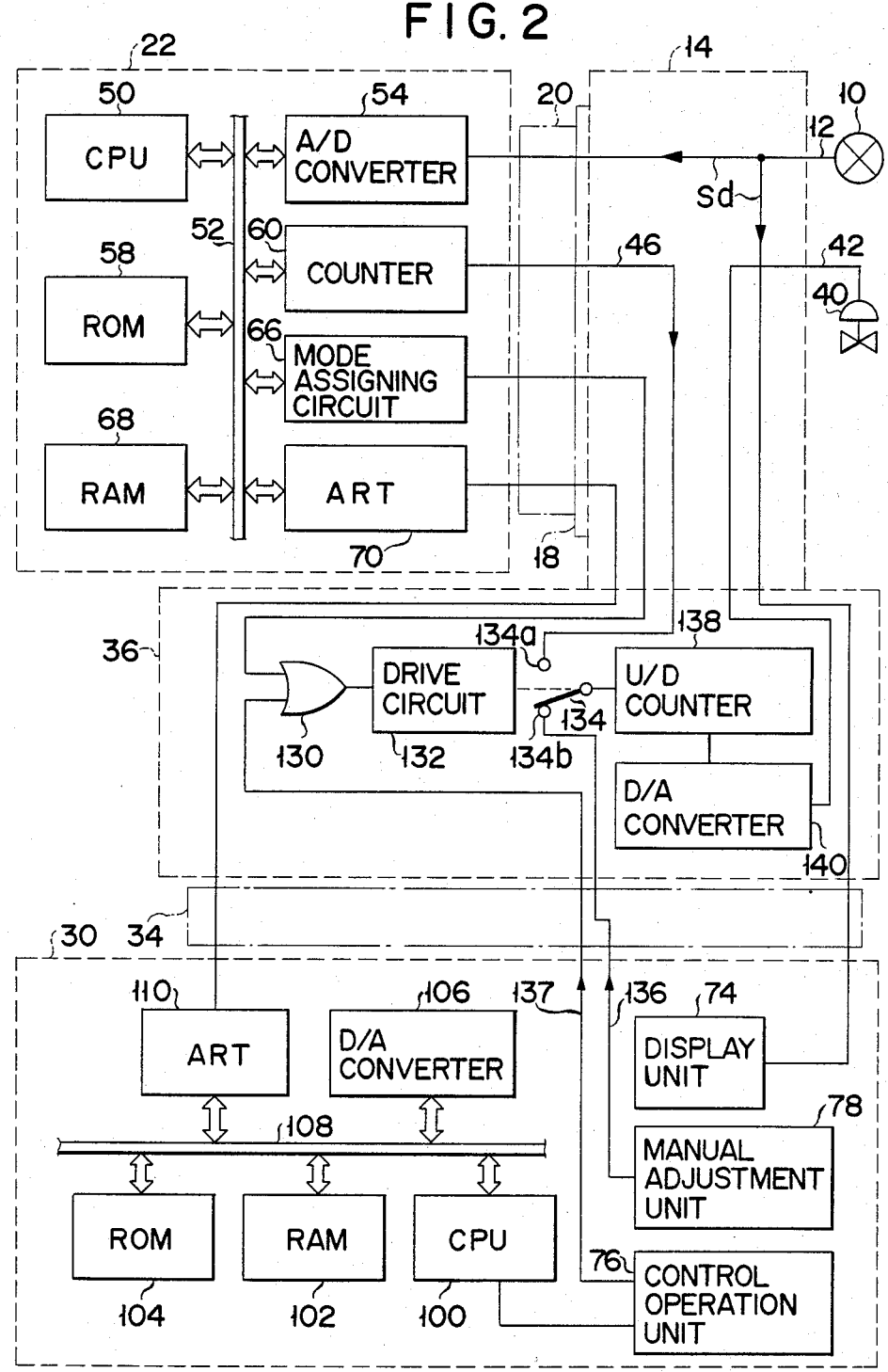
FIG. 2 is a block diagram of an internal arrangement of the process control system shown in FIG. 1.

Referring to FIG. 2, the internal arrangement of the separate type process system in FIG. 1 will be described. The control section 22 receives an analog detection signal Sd which corresponds to the process variable and which is supplied from the detector 10 through the signal relay section 14. The control section 22 compares the analog detection signal Sd with a preset target value. If there is a difference between the target value and the variable due to a disturbance or the like, the control section 22 produces a pulse signal 46 corresponding to a manipulated variable (MV) output in order to minimize the difference. As shown in FIG. 2, the control section 22 includes a central processing unit (CPU) 50 of a microprocessor. The CPU 50 is mounted on the printed circuit board 26 and is connected through a data bus 52 to an analog/digital (A/D) converter 54. The A/D converter 54 converts the detection signal (analog signal) Sd, which is supplied from the detector 10 directly coupled to the process, to a digital signal which can be processed in the CPU 50. A read-only memory (ROM) 58 connected to the data bus (internal bus) 52 stores function modules in a firmware manner which are required to perform input/output and control operations complying with the process control. Therefore, the CPU 50 receives the digital signal corresponding to the detection signal Sd from the detector 10 and processes the signal in accordance with the function modules stored in the ROM 58. The result of the operation (digital signal) from the CPU 50 is supplied to a counter 60 through the internal bus 52. The counter 60 generates the pulse signal 46 as the MV output of the control section 22. The pulse signal 46 here is a reference signal for the operation signal which is finally supplied to the process actuator 40.

The control section 22 includes a mode assigning circuit 66 which serves to select a process control mode (manual or automatic control mode). A random access memory (RAM) 68 is provided to exchange data with a high-performance computer (not shown) and/or to exchange data with other control sections such as the control section 22' if a plurality of control sections are arranged. Reference numeral 70 denotes an asynchronous receiver/transmitter (ART) which transfers signals between the control section 22 and the man-machine interface 30.

Figure 3:
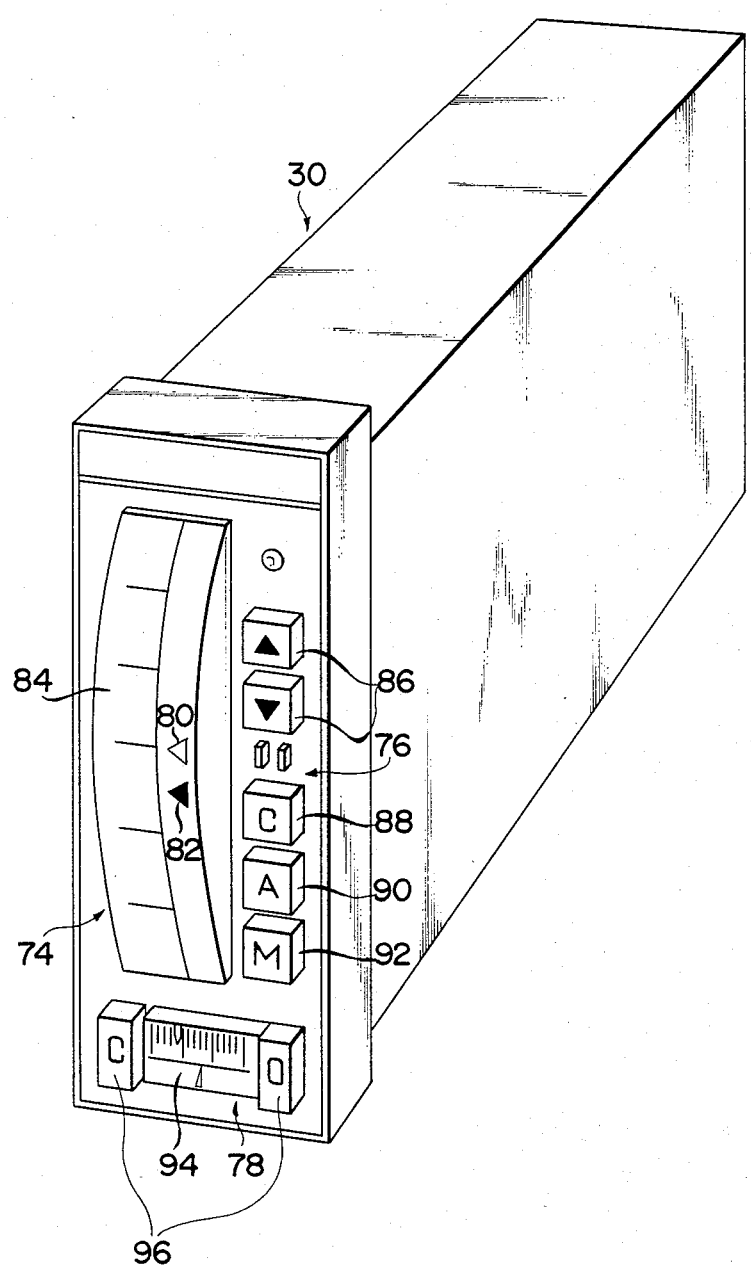
FIG. 3 is an enlarged perspective view of a man-machine interface device shown in FIG. 1.

The detection signal Sd from the process detector 10 is transmitted to the control section 22 and to the man-machine interface 30 through the signal relay section 14, the actuation output section 36 and the cable 34. The man-machine interface 30 includes a loop display unit 74 connected to the process detector 10 to monitor the process status, a control operation unit 76 for selecting the automatic and manual control modes, and a manual adjustment unit 78 for performing manual loop operation. The loop display unit 74 has a set point variable meter 80 on which a scale plate 84 is movably mounted, and a manipulated variable meter 82, as shown in FIG. 3. The display unit 74 may comprise an electronic bar graph on which light-emitting diodes (LEDs) are linearly aligned at predetermined intervals (e.g., 1 mm). The operator can monitor the process status and observe the reference value at the display unit 74.

The control operation unit 76 of the man-machine interface 30 has set point variable switches 86 for setting a desired set point variable, a switch 88 for assigning the cascade control, a switch 90 for assigning the automatic control mode, and a switch 92 for assigning the manual mode. The manual adjustment unit 78 has an output meter 94 and two manual operation switches 96. If the operator presses the manual mode switch 92, the operator manually operates the switches 96 and controls the process independently of the control by the control section 22.

Referring back to FIG. 2 again, the man-machine interface 30 further includes a CPU 100 connected to a first output of the control operation unit 76, a RAM 102, a ROM 104 and a D/A converter 106. These components are commonly connected to an internal bus 108. Therefore, the man-machine interface 30 has an extraction operation function, a correction coefficient operation function, a self-diagnosis function, and so on to back up a warning function, display of upper and lower limit preset values for the warning function, or an assignment of the process variable when the control section 22 is broken. An asychronous receiver/transmitter (ART) 110 is arranged to exchange signals between the man-machine interface 30 and the control section 22. The ART 110 is connected to the ART 70 of the control section 22 through the cable 34, the actuation output section 36, the signal relay section 14 and the cable 20.

Figure 4:
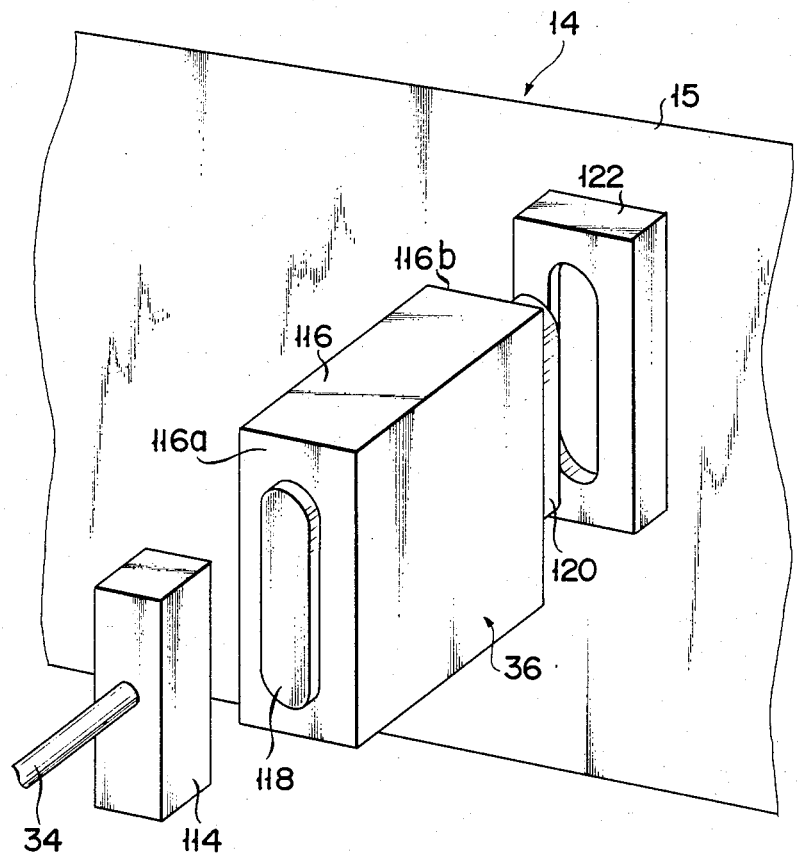
FIG. 4 is an enlarged perspective view of an operation output section and its peripheral part of the process control system shown in FIG. 1.

The man-machine interface 30 has a connector 114 (FIG. 1) which allows the interface to be detached from the actuation output section 36. FIG. 4 is an enlarged view showing the connections between the connector 114 and the actuation output section 36 and between the actuation output section 36 and the signal relay section 14. The actuation output section 36 is housed in a separate case 116. A receptacle 118 for the connector 114 connected to the man-machine interface 30 through the cable 34 is disposed at the end face 116a of the case 116 which is spaced apart from the other end face 116b. The man-machine interface 30 is freely connected to and disconnected from the case 116 of the actuation output section 36. A connector 120 is mounted on the other end face 116b of the case 116 of the actuation output section 36 to engage with a receptacle 122 mounted on the signal relay section 14, so that the actuation output section 36 is freely connected to and disconnected from the signal relay section 14.

Referring to FIG. 2 again, the internal arrangement of the actuation output section 36 will be described. The actuation output section 36 includes an OR network 130 which has input terminals to which an output terminal from the mode assigning circuit 66 in the control section 22 and a second output terminal from the control operation unit 76 in the man-machine interface 30 are connected respectively. An output terminal of the OR network 130 is connected to a switch drive circuit 132 of a known arrangement. The switch drive circuit 132 serves to selectively drive a mode selection switch 134 (two-position switch in this embodiment) arranged adjacent to it. A first terminal 134a of the mode selection switch 134 is connected to the output terminal of the counter 60 in the control section 22 through the signal relay section 14 and the cable 20. A second terminal 134b of the mode selection switch 134 is connected through the cable 34 to an output terminal of the manual adjustment unit 78 in the man-machine interface 30. Therefore, the operation signal 46 from the control section 22 and a manual operation signal 136 generated by manual operation by the man-machine interface 30 are selectively supplied to the mode selection switch 134. When the operator presses the manual mode switch 92 (FIG. 3), a manual mode assignment signal 137 is generated by the control operation unit 76 in the man-machine interface 30. In response to the manual mode assignment signal 137, the switch drive circuit 132 causes the mode selection switch 134 to change over to the second terminal 134b. Therefore, the manual operation signal 136 from the manual adjustment unit 78 is supplied to the up/down counter 138 through the mode selection switch 134. The output terminal of the up/down counter 138 is connected to a digital/analog (D/A) converter 140. The output terminal of the D/A converter 140 is connected to the actuator 40 of the process through the signal relay section 14 and the lead 42. Therefore, a digital actuation output (the operation signal 46 from the control section 22 or the manual operation signal 136 from the man-machine interface 30) from the mode selection switch 134 is supplied to and held in the up/down counter 138. Thereafter, the digital signal is converted to an analog signal by the D/A converter 140.

The components of the actuation output section 36 are integrated on a one-chip IC element (not shown) in the above embodiment. The IC element is housed in the case 116. Therefore, the case 116 is small in size and light in weight and can be stably mounted to the signal relay section 14 with the connector 120 and the receptacle 122. The area of the signal relay section 14 on the front panel is small.

According to the above embodiment, the man-machine interface 30 is separated from the control section 22 and is housed in the separate case 32. The man-machine interface 30 has a warning function and a back-up function for the control section 22. The signal relay section 14 and the actuation output section 36 are independently arranged between the man-machine interface 30 and the control section 22. The signal relay section 14 is detachably connected to the control section 22 through the cable 20. Further, the signal relay section 14 and the actuation output section 36 are detachable from each other by means of the connector 120 and the receptacle 122. The transmission lines for the detection terminal 10, the control section 22, the man-machine interface 30, the actuation output section 36 and the actuator 40 are bundled together in the signal relay section 14. Further, the actuation output section 36 and the man-machine interface 30 are connected to each other through the cable 34. The cable 34 fixed at the man-machine interface 30 is connected to the connector 114 which detachably engages with the receptacle 118 connected to the actuation output section 36. As a result, the control section 22, the signal relay section 14, the actuation output section 36 and the man-machine interface 30 are housed in the separate cases, respectively and are detachably connected to each other.

If the separate type process control system according to one embodiment of the present invention is used singly, the components 14, 22, 30 and 36 are connected in the manner as shown in FIG. 1. In this condition, if the operator wishes to perform normal automatic control, the operator presses the automatic mode switch 90 (FIG. 3) of the man-machine interface 30. The switch drive circuit 132 (FIG. 2) in the actuation output section 36 causes the mode selection switch 134 to change over to the first terminal 134a (position opposite to that shown in FIG. 2). Therefore, the operation signal 46 generated by the control section 22 is transmitted to the D/A converter 140 through the mode selection switch 134 and the up/down counter 138. The operation signal converted to the analog signal by the D/A converter 140 is supplied to the actuator 40 through the signal relay section 14.

If the system of the above embodiment is built up to a large-scale instrumentation system, a plurality of control sections 22, 22', ... are aligned parallel to each other in the case 28. These control sections 22, 22', ... are for different numbers of control loops in accordance with the subject of control. For example, in accordance with the control subject, a control section for a single loop, a control section for two loops, a control section for four loops, and so on are housed in the case 28. A plurality of detectors including the detector 10 and a plurality of actuators including the actuator 40 are connected to the one signal relay section 14 at the lower part of the cabinet 16 in accordance with the number of control sections. If a CRT display device (not shown) is included in the large-scale instrumentation system, the number of man-machine interfaces including the man-machine interface 30 is smaller than that of the actuator terminals 40. That is to say, the man-machine interface 30 is applied only to the important loops of the process to be always supervised by the operator, while the CRT display device (not shown) is used to perform centralized control over the other loops. The separate type process control systems of one embodiment of the present invention can be freely combined with ease and no loss for optimum control of various instrumentation systems on the instrumentation engineering level regardless of the large- or small-scale instrumentation.

In the above embodiment, even if the control section 22 is broken and is disconnected from the signal relay section 14, no output at the process actuator 40 or damage to the process control may be prevented. During the period for which the broken control section 22 is disconnected from the system, the up/down counter 138 in the actuation output section 36 maintains the actuator output. Therefore, no adverse effects are given to the process control, while the broken control section 22 is safely replaced with a new one or is easily repaired.

Further, during the period for which the broken control section is disconnected from the signal relay section 14, process control may be manually performed. When the operator presses the manual mode switch 92 (FIG. 3) in the man-machine interface 30, the switch drive circuit 132 causes the mode selection switch 134 in the actuation output section 36 to be changed over to the second terminal 134b. The operator can observe data of the process status detected at the detector 10 at the display unit 74. The operator thus operates the switches 96 (FIG. 3) in the manual adjustment unit 78 to manually perform the process control. The manual operation signal 136 from the manual adjustment unit 78 is transmitted to the D/A converter 140 through the mode selection switch 134. The digital signal is then converted to the analog signal by the D/A converter 140 and is finally supplied to the actuator 40. As described above, the manual process control can be performed during the period for which the control section is disconnected from the system since the man-machine interface 30 is connected to the detection terminal 10 and to the actuator 40 through the actuation output section 36 and the signal relay section 14 during this period.

Although the present invention has been shown and described with respect to a particular embodiment, nevertheless, various changes and modifications which are obvious to a person skilled in the art to which the invention pertains are deemed to lie within the spirit, scope and contemplation of the invention.

As shown in FIG. 4, the actuation output section 36 is housed in the case 116. The connecting members for connection with the signal relay section 14 and with the man-machine interface 30 are disposed on the opposing end faces of the case 116. The cable 20 from the control section 22 is connected, to a portion of the front panel of the signal relay section, separately of the actuator output section. However, the present invention is not limited to the above arrangement. For example, the cable 20 of the control section 22 may be connected to that surface of the actuation output section detachably connected to the signal relay section 14 which is connected to the cable 34 of the man-machine interface 30 through the connector 114.

Figure 5:
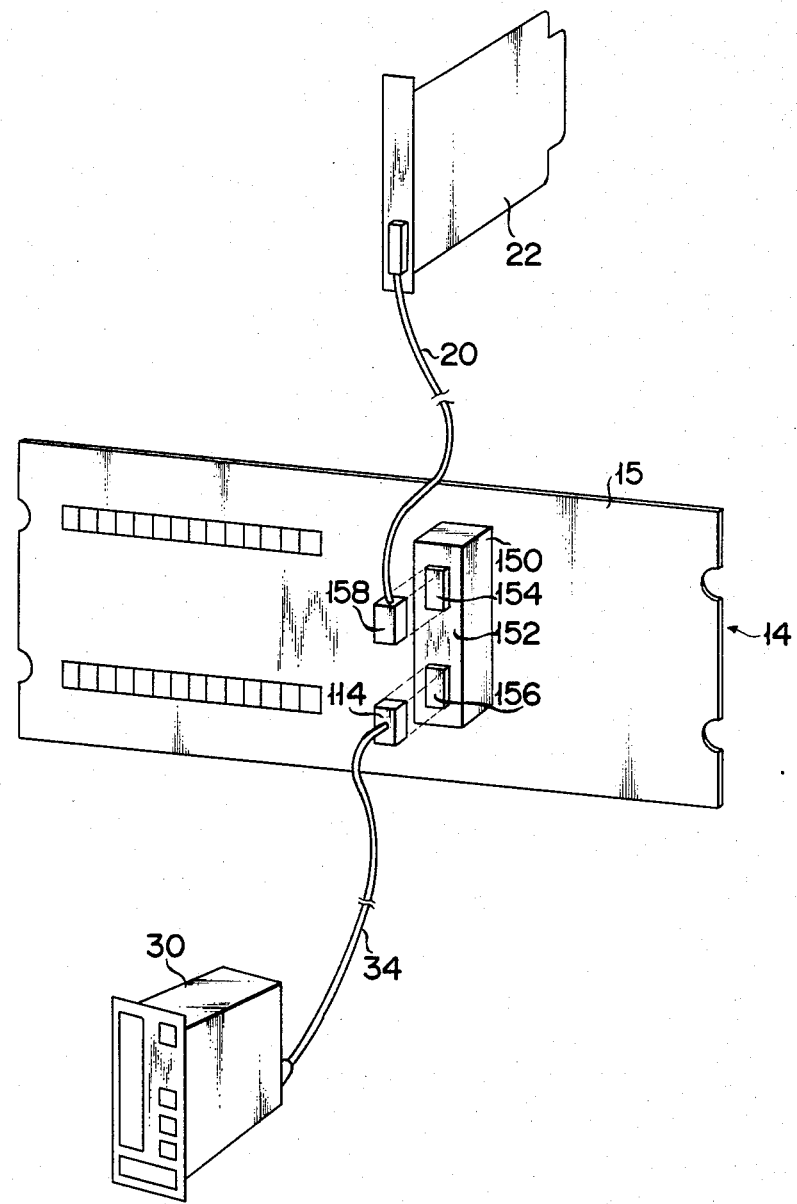
FIG. 5 is a perspective view showing the main part of a separate type process control system according to another embodiment of the present invention.

Referring to FIG. 5, two receptacles 154 and 156 are mounted on one surface 152 of an actuator output section which is connected to the signal relay section 14. The connector 114 is coupled to the receptacle 156 to connect the man-machine interface 30 and the actuation output section 150 through the cable 34. A connector 158 is coupled to the receptacle 154 to connect the actuation output section 150 and the control section 22 through the cable 20. The circuit diagram of the above arrangement is shown in FIG. 6. The actuation output section 150 includes the mode selection switch 134, the up/down counter 138 and the D/A converter 140. The man-machine interface 30 is connected to the detector 10 even if the control section 22 is disconnected from the actuation output section 150. The man-machine interface 30 is also connected to the actuator 40 through the mode selection switch 134, the up/down counter 138 and the D/A converter 140. In this alternate embodiment of the present invention described above, the same effect obtained in the former embodiment can be obtained. Further, according to another embodiment shown in FIGS. 5 and 6, since the control section 22 and the man-machine interface 30 can be connected to correspond to each other in the single actuation output section 150, inspection and maintenance can easily be performed.

What we claim is:

1. A process control system for performing process control connected to at least one detecting section for detecting a process variable and generating a corresponding detection signal and to at least one actuator section for changing the process status, said process control system comprising:

at least one microcomputer controlling means, housed in a first case member, for comparing the process variable with a preset target value in response to the detection signal and for subjecting a difference between the process variable and the preset target value, if any, to predetermined operations to produce a first electrical signal for minimizing the difference in a first operation mode;

man-machine interface means, disposed in a second case member and connected to a connector through a first cable extending from said second case member to outside said second case member, for displaying the process variable and the preset target value in response to the detection signal and for allowing an operator to manually adjust a second electrical signal for minimizing the difference in a second operation mode, said second electrical signal being transmitted through said first cable to outside said process control system;

output means, housed in a third case member which has a first surface with a receptacle detachably engaging with said connector of said man-machine interface means and a second surface, for receiving the first and second electrical signals and for selecting and holding one of the first and second electrical signals as an operation signal in accordance with one of the first and second operation modes, said second surface having a signal terminal which is exposed and which electrically transmits the operation signal to outside said process control system; and signal relaying means, having a connection panel to which at least said detecting section, said actuator section and said signal terminal of said output means are detachably connected, for transmitting the detection signal to said microcomputer controlling means and said man-machine interface means and for transmitting the operation signal from said output means to said actuator section connected to said connection panel, said signal relaying means, when another controlling means is provided for another control loop, performing its signal transmission operation also for said another controlling means.

2. A process control system according to claim 1, wherein said third case member of said output means is substantially of a rectangular parallelepiped shape, and said second surface on which said signal terminal is formed has a surface area smaller than a surface area of said connection panel.

3. A process control system according to claim 2, wherein said third case member of said output means is stably mounted on said connection panel when said signal terminal of said output means is connected to said connection panel of said signal relaying means.

4. A process control system according to claim 3, wherein said output means comprises:

switching means for receiving the first electrical signal from said microcomputer controlling means and the second electrical signal from said man-machine interface means and for selectively generating one of the first and second electrical signals in accordance with one of said first and second operation modes; and up/down counter means, connected to said switching means, for storing one of the first and second electrical signals output from said switching means for a predetermined time interval and for generating one of the first and second electrical signals as the operation signal after a predetermined period of time.

5. A process control system according to claim 4, wherein said output means is substantially integrated on at least one semiconductor device, said semiconductor device being stably housed in said third case member of said output means.

6. A process control system according to claim 4, wherein said man-machine interface means comprises mode assigning means for selecting one of the first and second operation modes in response to the operation of the operator and for generating a third electrical signal corresponding to a selected operation mode; and said output means comprises driving means for receiving the third electrical signal and for driving said switching means in response to the third electrical signal transmitted through said cable of said man-machine interface means.

7. A process control system according to claim 1, further comprising at least one further microcomputer controlling means, said man-machine interface means being arranged for a specific one of said microcomputer controlling means and being fewer in number than the number of said microcomputer controlling means, said signal relaying means also performing a signal transmission operation for said one further microcomputer controlling means.

8. A process control system according to claim 7, wherein each said microcomputer controlling means is housed in said first case member.

9. A process control system according to claim 1, wherein said output means comprises wire means for receiving the detection signal through said signal relaying means and said signal terminal thereof and for supplying the detection signal through said cable of said man-machine interface means to said man-machine interface means which is connected to said output means through said connector thereof, said wire means being connected to said signal relaying means at said connection panel when said signal terminal of said output means is connected to said connection panel, whereby the detection signal is supplied to said man-machine interface means through said signal relaying means and said output means.

10. A process control system according to claim 9, wherein said at least one microcomputer controlling means comprises memory means including function modules for storing programs to perform predetermined kinds of operations, and central-processing unit means for performing an operation in accordance with the selected function module stored in said memory means, said memory means and said central-processing unit means being mounted on a predetermined single printed circuit board; and said first case member of said microcomputer controlling means having enough internal space to house a plurality of printed circuit boards in parallel relation to each other.

11. A process control system according to claim 10, wherein said microcomputer controlling means comprises:

a second cable electrically connected between said printed circuit board on which is mounted said memory means and said central-processing unit means of said at least one microcomputer controlling means and said connection panel so as to transmit at least the detection signal from said detecting section to said at least one microcomputer controlling means and the first electrical signal from said at least one microcomputer controlling means to said connection panel; and a connector which is mounted on an end portion of said second cable and connected to said connection panel.

12. A process control system according to claim 11, wherein said signal relaying means comprises a receptacle to which said connector of said at least one microcomputer controlling means is detachably connected at a predetermined portion of said connection panel, and wire means for transmitting the detection signal from said detecting section, connected to said connection panel, to said receptacle thereof, and for supplying the first electrical signal from said at least one microcomputer controlling means, connected to said connection panel, through said signal terminal to said output means, connected to said connection panel.

13. A process control system according to claim 11, wherein said output means comprises, in a predetermined portion of said first surface, a further receptacle to which said connector of said at least one microcomputer controlling means is detachably connected, so that the first electrical signal from said at least one microcomputer controlling means, connected to said output means, is supplied to said output means through said further receptacle thereof.

14. A process control system according to claim 13, wherein said output means further comprises further wire means for receiving the detection signal through said signal relaying means and said signal terminal of said output means and for supplying the detection signal to said at least one microcomputer controlling means.

* * * * *